June 9, 1959  A. G. VAN ALSTYNE ET AL  2,889,636
AIRCRAFT SIMULATOR FOR RADAR TRAINING
Filed March 8, 1954  2 Sheets-Sheet 1

ALVIN GUY VAN ALSTYNE,
THOMAS J. JOHNSON,
INVENTORS.

BY
Barkeless & Scantlebury
ATTORNEYS.

June 9, 1959     A. G. VAN ALSTYNE ET AL     2,889,636
AIRCRAFT SIMULATOR FOR RADAR TRAINING
Filed March 8, 1954

ALVIN GUY VAN ALSTYNE,
THOMAS J. JOHSON,
INVENTORS.

BY
ATTORNEYS.

United States Patent Office 2,889,636
Patented June 9, 1959

2,889,636

AIRCRAFT SIMULATOR FOR RADAR TRAINING

Alvin G. Van Alstyne and Thomas J. Johnson, Los Angeles, Calif., assignors to Gilfillan Bros. Inc., Los Angeles, Calif., a corporation of California Application March 8, 1954, Serial No. 414,608

2 Claims. (Cl. 35—10.4)

This invention has to do with training devices for use in training operations having to do with radar systems, and more especially with radar systems for observing and controlling the approach of aircraft to a landing field. The invention will be described illustratively as it relates to radar systems of the type known as Ground Controlled Approach (GCA) systems.

In GCA systems the position of an approaching aircraft is indicated on the screen of a cathode ray tube in direct relation to a representation of the selected flight path to a landing. An operator observes that position and informs the pilot of the aircraft, typically by voice radio, of any changes in course that may be required.

The training of operators of such GCA systems has frequently required that one or more aircraft be actually flown in order to present control problems for solution as part of the training procedure. That is expensive and may be inconvenient.

The present invention greatly facilitates such training by providing means by which the position of an artificial aircraft may be represented on the screen of the regular indicator tube of the radar system and may be caused to move in a realistic manner under arbitrary control, for example by an instructor. It is not sufficient for the present purpose to provide a simple pip on the radar screen that can be moved about directly by the instructor in the manner of a pointer, for it is difficult or impossible for the instructor to estimate continuously during an approach just how the pip should move. In particular, it is difficult to know in detail how that movement would be affected by a particular change of course or speed.

The present invention permits the instructor to control the artificial aircraft by operating controls that correspond directly to the principal controls that are actually used by an aircraft pilot for controlling his aircraft. In fact, they correspond directly to the controls that would be operated in an actual aircraft to obey the instructions received from the GCA operator. With an artificial aircraft controlled realistically in that particular manner, the instructor can receive instructions by telephone from the operator under training and can operate the controls of the artificial aircraft in accordance with those instructions. The student then sees a representation on the radar screen of the movement that would actually result if a real aircraft were following those instructions in the same manner. Any error or lack of clarity in the instructions can be clearly and forcefully illustrated for the student by directly showing him, in terms of the movement of the artificial aircraft, how a real aircraft might respond under such conditions. The instructor can also illustrate errors that are likely to be made by the pilot, and can teach the student to anticipate and avoid such errors.

A primary object of the invention is to provide means for producing an artificial aircraft, controllable in the manner described, on the precision indicator screen of a GCA radar system. The precision indicator ordinarily includes distinct azimuth and elevation displays, which represent the position of the aircraft in azimuth and elevation, respectively, each display also providing a representation of range. Whereas the present invention may be utilized in connection with either or both of those displays, it is particularly concerned with the azimuth display, and will be illustratively described for the sake of clarity with reference to that particular type of display only. The precision azimuth display of a GCA system typically covers a range of azimuth angle of about 20 to 30 degrees. Within such an angular range, the artificial aircraft of the invention may be caused to move realistically in range and azimuth in response to manually operable means which control directly the aircraft speed and its rate of turn.

For such purposes as have been described, it is ordinarily required only that the artificial aircraft move in a generally realistic manner, absolute geometrical accuracy being unnecessary. The present invention utilizes that fact to provide particularly simple and economical means for effectively deriving the range and position angle of the aircraft from control signals that represent its speed and rate of turn. A particular object of the invention is to accomplish that derivation with sufficient accuracy for the purpose at hand and without unnecessary complication of instrumentation.

A further object of the invention is to produce an artificial aircraft of the type described with maximum utilization of the regular radar system, thereby requiring a minimum of additional instrumentation. Moreover, in the preferred form of the invention, the artificial aircraft may be displayed in conjunction with the normal video signal of the radar system. That promotes realism by the presentation of the training problem against a normal and fully realistic background.

A system for producing an artificial aircraft having different characteristics and purposes from those of the present invention is described and claimed in the copending patent application, Serial No. 265,978, filed January 11, 1952 by one of the present inventors, Alvin G. Van Alstyne, under the title "Artificial Aircraft." In particular, that system does not permit manual control of the artificial aircraft in terms of realistic flight variables such as speed and rate of turn; and provides no means for deriving signals representing position coordinates of the artificial aircraft under joint control of a speed signal and a rate of turn signal.

A full understanding of the invention, and of its further objects and advantages, will be had from the following description of a typical preferred embodiment, of which description the accompanying drawings are a part. The particulars of that description are intended only as illustration, and not as a limitation of the scope of the invention, which is defined in the appended claims.

Figure 1:
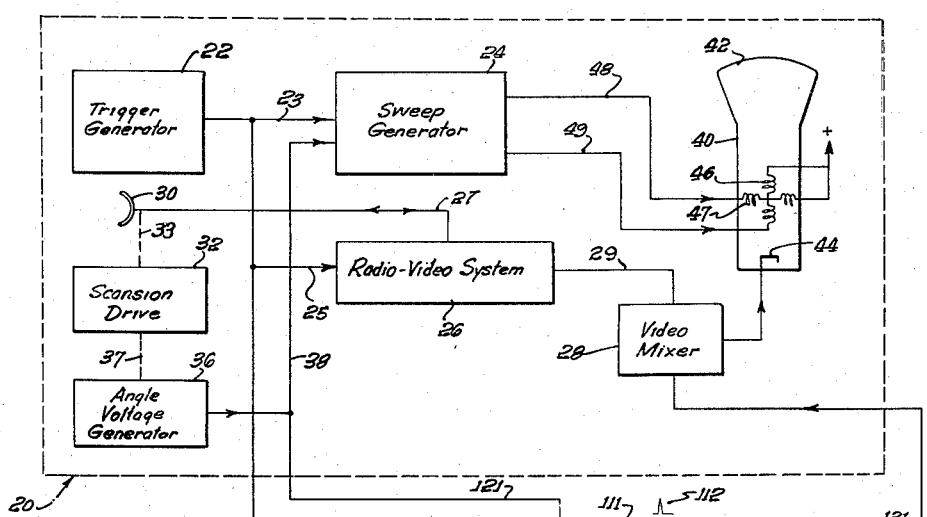
Fig. 1 is a schematic and block diagram, representing an illustrative embodiment of the invention.

In Fig. 1 an illustrative radar system is represented in simplified form at 20. A system trigger generator 22 develops in known manner a series of trigger pulses, which are delivered via line 23 to the sweep generator 24 and via line 25 to the radio-video system 26. System 26 develops in known manner respective series of radio frequency oscillations in timed relation to the successive pulses from the system trigger. Those radio frequency oscillations are delivered via suitable means 27 to the antenna indicated schematically at 30, and are radiated therefrom as a directed radar beam. The direction of that beam can be systematically varied in azimuth to produce scansion of the beam within a predetermined angular range, drive means for causing such azimuth scansion being indicated schematically at 32, linked with antenna 30 by means indicated schematically at 33. A signal, typically a voltage, corresponding to the instant position angle of the radiated beam from antenna 30, is generated by suitable angle voltage generating means, indicated schematically at 36 and mechanically linked at 37 with antenna drive 32. The angle voltage signal from generator 36 is delivered via the line 38 as a control signal to sweep generator 24.

The radar indicator tube 40 typically comprises a cathode ray tube with tube screen 42, means represented schematically at 44 for producing under selective control of an impressed voltage a cathode ray beam directed toward screen 42, and beam deflecting means indicated typically as two magnetic coils 46 and 47 which act in response to variable deflection currents to deflect the cathode ray beam in respective vertical and horizontal axial planes, thereby shifting the visible point of incidence of the beam on screen 42.

Figure 2:
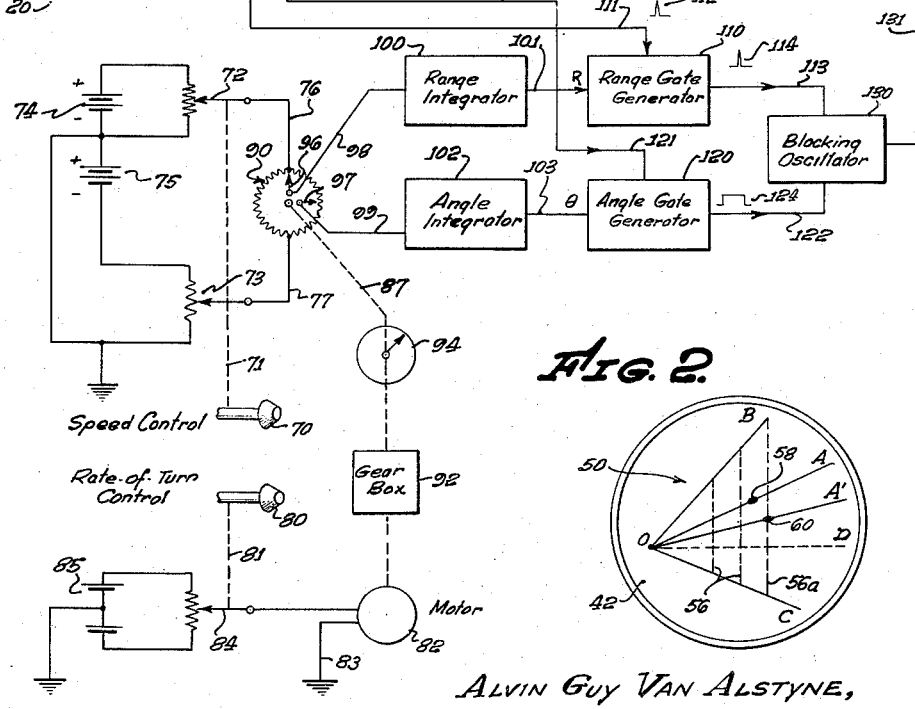
Fig. 2 is an elevation of a cathode ray tube screen illustrating the invention.

Sweep generator 24 produces in known manner deflection currents which are supplied respectively to deflection coils 46 and 47 via the lines 48 and 49. The deflection currents typically produce current waves of sawtooth form, and are synchronized with each other and with the system trigger pulses supplied via line 23 to the sweep generator. The deflection current pulses supplied to horizontal deflection coil 47 are typically of approximately uniform amplitude, and establish a periodic time base sweep of the cathode ray beam at a definite uniform rate across screen 42 from a predetermined zero position 0 in a direction parallel to horizontal axis 0D and toward the right as seen in Fig. 2. The deflection current pulses supplied to vertical deflection coil 46 are of variable amplitude, responsive to variations in the scansion angle of antenna 30 as represented by the signal voltage supplied via line 38 to sweep generator 24. The beam is thereby caused to move from zero position 0 along a sweep path such as 0A in Fig. 2, the angle of path 0A representing at an expanded scale the instant scansion angle of the radar beam. The limits of the scansion movement of sweep path 0A, corresponding to the effective limits of scansion in azimuth of antenna 30, are indicated at 0B and 0C.

Radio frequency radiation from antenna 30 is partially reflected by objects, such as aircraft, in its path, and the reflected energy picked up by the antenna is transmitted via means 27 to system 26, which includes video amplifying means. A normal video signal corresponding to the reflected radiation is delivered via line 29 and mixer 28 as a beam intensifying voltage pulse to an electrode 44 of the cathode ray tube. That video signal typically intensifies the cathode ray beam momentarily at a definite point of its sweep path 0A, producing at that point a bright spot as indicated at 58. The horizontal position of that spot with respect to zero 0 corresponds to the time of transit of the initial and reflected radio beams, and constitutes a measure of the range from antenna 30 to the reflecting object. Vertical lines or range marks, indicated at 56, may be produced by known means, not shown, on tube screen 42 to provide a range scale. The angular position of spot 58 with respect to zero 0 corresponds to the scansion angle of the antenna at the time of the sweep path 0A, and provides a measure of the azimuth angle of the reflecting object with respect to the scansion range of antenna 30. The resulting type of display is commonly known as an expanded partial plan display of the target position. In actual practice a large number of spots such as 58 are typically visible on screen 42, produced by different targets within the range of the radar beam, their positions on the screen corresponding in the manner described to the respective ranges and azimuth positions of the several targets.

It will be understood that many elements and features of usual radar systems have been omitted in Fig. 1 for the sake of clarity of description. In particular, antenna means and associated circuitry may be provided for scanning in elevation, and indicator means may be provided for displaying elevation information, either on the screen of a separate cathode ray tube or on the screen of the same tube with azimuth display 50. A system for producing such a combined display is described in illustrative form and is claimed in Patent No. 2,649,581, issued on August 18, 1953, to Homer G. Tasker et al.

In accordance with the present invention, means are provided by which one or more additional bright spots, typically represented at 60 in Fig. 2, may be produced artificially at respective positions on screen 42 that are controllable in a particular manner. The manner of that control is required to be such that the movement of the additional spot 60 corresponds approximately to the movement that it would display if it were produced by reflected radiation from an actual aircraft within the range of antenna 30; and if that actual aircraft were flying under definite conditions of speed and rate of turn. Because of its likeness to the indication of such an actual aircraft, the spot 60 of the invention is herein referred to as an "artificial aircraft." A further feature of the invention is that the speed and rate of turn of such an artificial aircraft are subject to continuous and arbitrary manual control.

In Fig. 1 a manual speed control for the artificial aircraft is shown schematically at 70 in the form of a rotatable knob linked by means indicated at 71 to two ganged potentiometers 72 and 73, which are preferably identical. The windings of the potentiometers 72 and 73 are supplied from any suitable source with voltages of equal magnitude and opposite polarity. Such voltage sources, which may provide either direct or alternating current voltages, are indicated at 74 and 75, respectively. The voltages tapped on lines 76 and 77 from potentiometers 72 and 73 are then of equal magnitude and opposite polarity and jointly constitute a speed signal.

A manual rate of turn control for the artificial aircraft is shown schematically as the knob 80, which is linked by means indicated at 81 to any suitable type of control mechanism for driving a motor at a speed that is variable in magnitude and direction in accordance with the angular position of knob 80 with respect to an intermediate zero position. As illustrated, the motor 82 is shown as a reversible direct current motor with one terminal grounded and the other terminal connected to the movable contact of the potentiometer 84, which is directly linked to rate of turn control 80. The winding of potentiometer 84 is connected across a source of direct current, indicated at 85, the center of that voltage source being grounded. When rate of turn control 80 is at its intermediate zero position, potentiometer 84 is centered and supplies zero voltage to either the field or armature of motor 82, the other being constantly supplied via grounded line 83 with a current of fixed polarity. The motor therefore remains stationary. If knob 80 is displaced from its zero position in either direction, potentiometer 84 supplies to motor 82 a voltage proportional to that displacement and of polarity corresponding to the direction of the displacement, driving motor 82 at corresponding speed and direction.

A sine potentiometer is indicated schematically at 90, with its winding connected directly between lines 76 and 77. The control shaft 87 of sine potentiometer 90 is mechanically linked to motor 82, as indicated by the dashed line 87, speed reducing means such as the gear box 92 being preferably provided in that linkage. Shaft 87 is driven at such angular rate with respect to motor 82 and its control 80 that the shaft position represents continuously the direction of travel of the artificial aircraft with reference to a selected zero direction. That zero direction may be taken as the normal direction of flight for making a landing under control of the radar system. That zero direction is typically indicated in Fig. 2 by the line 0D. Direction indicating means, represented at 94, may be driven with potentiometer shaft 87, and thus provide continuous indication of the direction of flight of the artificial aircraft.

Potentiometer 90 is provided with a cosine tap 96 and a sine tap 97, so arranged that the voltages tapped from the potentiometer winding at 96 and 97 are equal to the magnitude M of the equal positive and negative voltages applied across its winding multiplied by the cosine and by the sine, respectively, of the position angle A of the potentiometer. Thus the voltage at cosine tap 96 is M cos A and the voltage at sine tap 97 is M sin A. As angle A is varied by operation of motor 82, the respective voltages at 96 and 97 therefore vary in a definitely determined manner.

In accordance with the present invention, the voltage at cosine terminal 96 of potentiometer 90 is taken on line 98 and is utilized as a signal representing the rate of change of range of the artificial aircraft with respect to the ground zero of the system; and the voltage at sine tap 97 is taken on line 99 and is utilized as a signal representing the rate of change of azimuth angle of the artificial aircraft about that ground zero. Manipulation of flight controls 70 and 80 directly control one set of variables, namely the rate of turn, represented by the velocity of rotation of motor 82, and the artificial aircraft speed in the direction of its heading, represented by the voltage applied across potentiometer 90. The very simple mechanism, a typical embodiment of which has been described, derives from those input variables a second set of variables, typified by the voltages at 96 and 97, respectively, which provide approximate representations of the rate of change of range and the rate of change of azimuth angle of the artificial aircraft. By utilizing those signals as range and angle rate signals, the invention achieves great simplification of instrumentation, while providing a final display that is sufficiently accurate for the purpose at hand within the 20 to 30 degree field of the usual azimuth display.

The respective range and angle rate signals from the cosine and sine taps of potentiometer 90 are electronically integrated with respect to time by any suitable means, indicated in block form at 100 and 102, respectively. Range integrator 100 produces at its output terminal 101 a voltage signal that is proportional to the time integral of the input voltage from 96, and that represents the instant radial distance or range of the artificial aircraft from the ground zero of the system. Angle integrator 102 produces at its output terminal 103 a voltage signal that is proportional to the time integral of the input voltage from 97, and that represents the instant azimuth angle of the artificial aircraft about the ground zero. The two output signal voltages at 101 and 103 therefore represent polar coordinates that define the instant position of the artificial aircraft, and will be referred to as polar position signals.

Those polar position signals are employed to modulate the electron beam in indicator tube 40 at those moments when the beam is passing over the point of screen 42 that corresponds to the instant values of the signals. For example, if the angle signal at 103 represents an azimuth angle corresponding to sweep path 0A' of Fig. 2, the electron beam is intensified only during beam sweeps substantially coinciding with sweep path 0A'. And if the range at 101 represents a range corresponding to range mark 56a, for example, the electron beam is intensified only at moments that follow a system trigger by a definite time delay corresponding to that range, that is, corresponding to the sweep duration from zero 0 to range mark 56a. By superposition of those two limitations upon the time of beam intensification, a bright spot 60 is caused to appear in the expanded partial plan representation on screen 42 at the proper angle and at the proper position along horizontal range axis 0D to represent correctly the position of the artificial aircraft as represented by the two polar position signals.

A range gate generator is indicated in block form at 110, receiving the range position signal from 101 and receiving over line 111 from 22 the periodic system triggers, typically indicated at 112. Range gate generator comprises any suitable device acting to produce on line 113 a series of sharply defined pulse gates, typically indicated at 114, each gate following a system trigger 112 by a definite time interval determined in accordance with the voltage of the range signal.

An angle gate generator is indicated in block form at 120, receiving the angle position signal from 103, and supplied over line 121 with voltage from angle voltage generator 36, which voltage corresponds to the instant azimuth scansion angle of antenna 30. Angle gate generator 120 comprises any suitable type of circuitry for comparing the voltage signals on lines 103 and 121 and for producing on line 122 an output gate in response to a definite relationship, typically equality, between those input voltages. That angle gate represented typically at 124 may have a duration that includes several successive sweeps of the cathode ray beam, the angle of those sweeps on indicator screen 42 corresponding approximately to the azimuth angle of the artificial aircraft as represented by the position signal on line 103.

The angle gate on line 122 and the range gate on line 113 are supplied to a video signal generator 130, which may typically comprise a blocking oscillator, and which develops on line 131 a sharp voltage pulse in response to coincidence of a range gate and an angle gate. That pulse is typically supplied as a video signal to video mixer 28, where it is combined with the regular video signal from system 26, and acts at electrode 44 to modulate the cathode ray beam of indicator tube 40.

Figure 3:
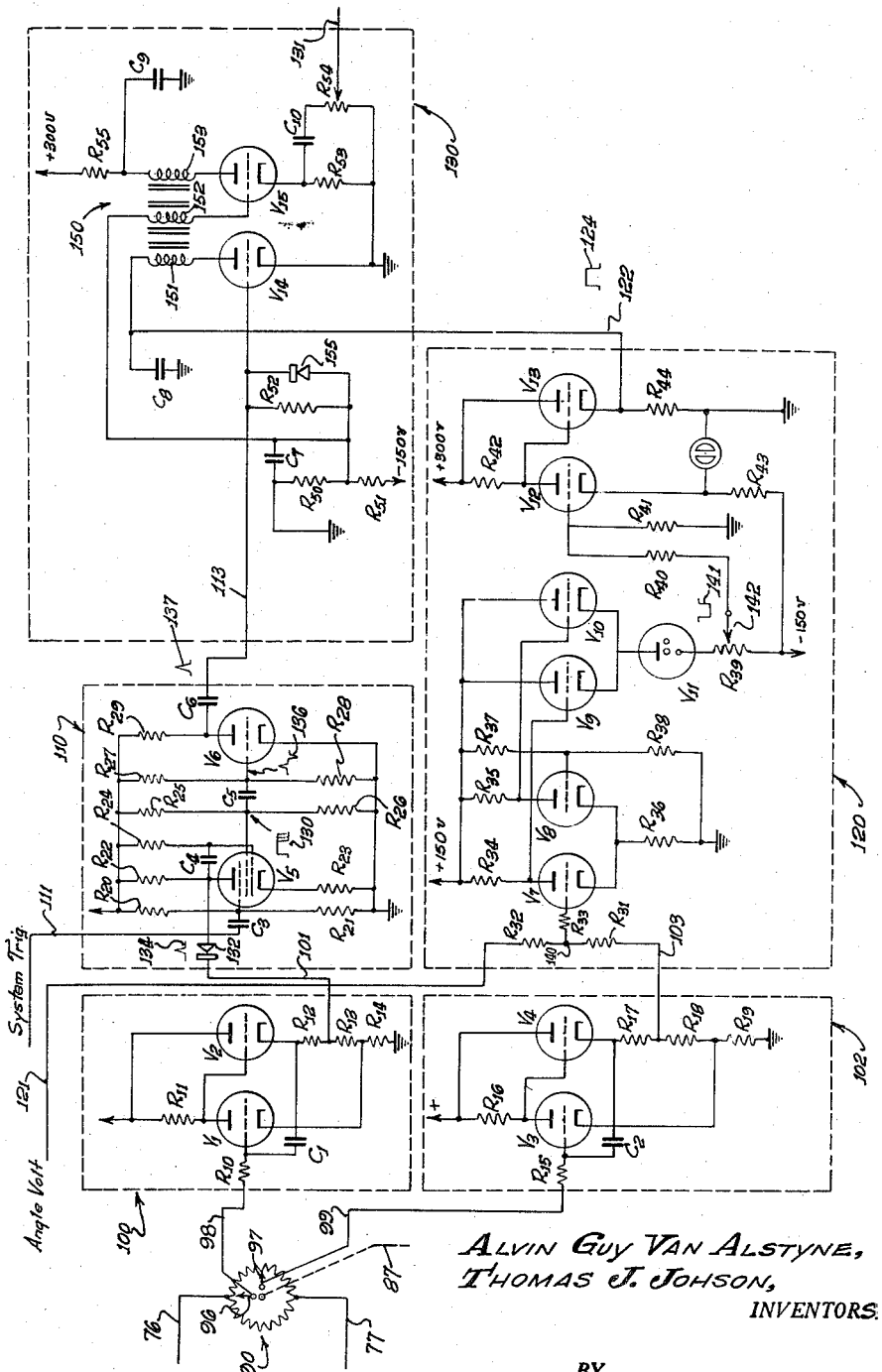
Fig. 3 is a schematic diagram representing further illustrative details of the embodiment of Fig. 1.

Fig. 3 shows illustrative circuitry for carrying out the invention. Integrators 100 and 102 are shown as electronic integrators of Miller type comprising respective series resistors R10 and R15 through which the signals on lines 98 and 99 are supplied to amplifying stages V1 and V3 and cathode follower stages V2 and V4 of the respective circuits. The circuits include plate resistors R11 and R16 and cathode resistor strings R12, R13, R14 and R17, R18, R19. The outputs are taken from the plates of V1 and V3 via cathode followers V2 and V4, respectively, and fed back to the respective inputs via integrating capacitances C1 and C2 to maintain the inputs substantially at ground potential. The respective output signals on lines 101 and 103 are thus voltages that vary from a fixed positive base by an amount proportional to the negative time integral of the current flowing in resistors R10 and R15 in response to the range rate signal on line 98 and the angle rate signal on line 99, respectively. For example, if positive values of the range rate voltage are taken to represent flight toward the ground zero, which is the predominant direction during landing operations, then the output on line 101 is a positive voltage that decreases with decreasing range. And if positive values of the angle rate voltage are taken to represent increasing azimuth angle, the output on line 103 is a positive voltage that decreases with increasing azimuth angle.

Range gate generator 110 utilizes a cathode coupled phantastron tube V5 with plate resistor R22 and cathode resistor R23 to produce a positive going square wave, as indicated at 130, in response to each system trigger received via line 111 from trigger generator 22 (Fig.

1). The length of square wave 130 is controlled directly by the range position signal on line 101, which is applied to the plate of V5 via rectifier 132 in a manner to set the plate potential at the start of each cycle. At that time the tube suppressor is held by voltage divider R20, R21 at a potential that cuts off tube current from the plate, while the positive grid return via R24 permits current flow to the screen and R25. A positive system trigger 134 delivered via C3 to the suppressor initiates conduction to the plate, thereby lowering the grid via C4 and sharply reducing both the screen current and the current through cathode resistor R23. A positive going square wave 130 is thereby initiated at the tube screen; and is terminated when the plate bottoms due to current through R24 and C4, returning conduction relatively abruptly to the screen. The length of the square wave depends inversely on the initial plate potential, and with suitable selection of components may be made substantially proportional to the range represented by the signal on line 101.

Square wave 130 is differentiated by C5, R26, and the resulting spaced positive and negative pulses 136 are supplied to the grid of amplifying tube V6, which normally conducts heavily due to positive grid return to voltage divider R27, R28. Only the negative pulse is appreciably amplified, appearing at the plate as a sharp positive going range gate 137, which is delivered to line 113 via C6.

The angle gate generator, as shown illustratively at 120, includes a differential amplifier comprising tubes V7 and V8 with respective plate resistors R34 and R35 and with common cathode resistor R36. The plates of V7 and V8 are respectively coupled directly to the grids of tubes V9 and V10, which have the common cathode resistor R39, connected in series with the voltage control tube V11. R39 is a potentiometer from which an output is taken with variable amplitude via line 142. The angle position signal on line 103 and the antenna angle voltage received via line 121 are added by the resistances R31 and R32, and the resulting signal at their junction 140 is supplied via R33 to the grid of tube V7. The signal on line 103 is typically a direct current voltage proportional to the negative of the azimuth angle of the artificial aircraft; and the signal on line 121 is directly proportional to the antenna scansion angle. If, as is typically the case, antenna 30 scans alternately in opposite directions, the signal at 140 alternately increases and decreases, passing through some definite value when the scansion angle corresponds to the angular position of the artificial aircraft. During the scansion for which that signal rises, V7 is initially cut off, while return of the grid of V8 to voltage divider R37, R38 maintains conduction in V8. Tube V9 is thereby caused to conduct, and V10 is cut off. As the grid of V7 approaches the critical value, conduction is initiated in V7, lowering its plate and cutting off V9. A negative gate 141 is thereby initiated on line 142. Conduction in tube V7 also raises the common cathodes of V7 and V8, soon cutting off V8. V10 is thereby rendered conductive, raising line 142 substantially to its initial potential and terminating the gate. As the signal at 140 decreases through the critical value during scansion in the other direction, that process is reversed. The common cathodes of V7, V8 follow the grid of V7 down until, near the critical value, V8 starts to conduct, cutting off V10 and initiating a negative going gate on line 142. Shortly thereafter V7 is cut off, rendering V9 conductive and terminating the gate.

The negative gate 141 on line 142 is amplified and inverted by V12 and is supplied via cathode follower V13 to line 122 as the positive going gate 124 that represents substantial equality between the azimuth angle of the artificial aircraft, as represented by the position signal on line 103, and the scansion angle of the antenna, as represented by the angle voltage on line 121. Resistances R40, R41, R42, R43 and R44 are connected as shown in the drawing.

Video signal generator 130, as illustratively shown in Fig. 3, comprises a blocking oscillator that includes tubes V14 and V15 and transformer 150. Line 122 is connected via capacitance C8 to ground and via the first primary 151 of transformer 150 to the plate of V14, lifting the plate to operating potential only during an angle gate. The range gate on line 113 is supplied directly to the grid of V14, and via rectifier 155 and transformer secondary 152 to the grid of V15. Rectifier 155 is shunted by resistance R52. Tube V15 is connected as a cathode follower with the second primary 153 of transformer 150 in its plate circuit in series with R55. The junction of winding 153 and R55 is grounded via capacitance C9. V14 and V15 are normally cut off by grid return to voltage divider R50, R51. If it occurs during an angle gate 124, a range gate at the grid of V14 draws a current pulse through transformer primary 151 from grounded capacitance C8. Transformer action reinforces the positive range gate at the grid of V15, and the resulting current flow through transformer primary 153 from grounded C9 produces further regenerative action. Upon substantial discharge of C8 and C9 the current in both tubes decreases, and regenerative transformer action accelerates that decrease. The sharp voltage pulse developed across cathode resistor R53 is transmitted via C10 to potentiometer R54, from which an output video signal of variable amplitude is tapped on line 131.

We claim:

1. A test and training device for use with a radar system of the type that produces on a cathode ray tube screen by means of a cathode ray beam an expanded partial plan display of the azimuth angle and range of targets with respect to a predetermined zero, said device producing an indication of the approximate position of an artificial aircraft and comprising the combination of means for producing an arbitrarily variable heading signal representing the heading of the artificial aircraft, means for producing an arbitrarily variable speed signal representing the speed of the artificial aircraft in the direction of said heading, means responsive to said speed signal and said heading signal for producing an approximate rate of change of range electrical signal proportional to the product of the speed signal by the cosine of the heading signal and an approximate rate of change of position angle electrical signal proportional to the product of the speed signal by the sine of said heading signal, means for electrically integrating said rate of change of range signal with respect to time to produce an approximate range signal, means for electrically integrating said rate of change of position angle signal with respect to time to produce an approximate position angle signal, and means responsive to said range signal and said position angle signal for modulating the cathode ray beam to indicate on said cathode ray screen the approximate range and position of the artificial aircraft.

2. A test and training device for use with a radar system of the type that produces on a cathode ray tube screen by means of a cathode ray beam an expanded partial plan display of the azimuth angle and range of targets with respect to a predetermined zero position, said device producing an indication of the approximate position of an artificial aircraft and comprising the combination of a rotatable shaft, means for driving said shaft at a speed that corresponds to the rate of turn of an artificial aircraft, a sine potentiometer mounted on said shaft and having two coil terminals and sine and cosine brushes, means coupled to said coil terminals for generating and applying to said coil terminals equal and opposite voltages whose magnitude corresponds to the speed of the artificial aircraft, means coupled to said brushes for integrating the voltage signals appearing at each brush whereby an approximate range and approximate position angle electrical signals of the artificial aircraft with respect to said zero position are produced, and means responsive to said approximate range signal and said approximate position angle signal to modulate the cathode ray beam and thereby indicate effectively continuously on the said cathode ray screen the range and position represented by those signals.

References Cited in the file of this patent

UNITED STATES PATENTS

| | | |
|---|---|---|
| 2,442,788 | Treptow | June 8, 1948 |
| 2,465,624 | Agins | Mar. 29, 1949 |
| 2,471,315 | Dehmel | May 24, 1949 |
| 2,510,529 | Takats | June 6, 1950 |
| 2,555,442 | Hales | June 5, 1951 |
| 2,560,527 | Dehmel | July 10, 1951 |
| 2,674,812 | Hales | Apr. 13, 1954 |
| 2,677,199 | Droz | May 4, 1954 |
| 2,744,339 | Paine | May 8, 1956 |